(12) United States Patent
Ni

(10) Patent No.: US 10,524,626 B2
(45) Date of Patent: Jan. 7, 2020

(54) MOTOR NOISE REDUCTION STRUCTURE FOR DUST COLLECTOR, AND DUST COLLECTOR

(71) Applicant: KINGCLEAN ELECTRIC CO., LTD., Suzhou, Jiangsu (CN)

(72) Inventor: Zugen Ni, Jiangsu (CN)

(73) Assignee: KINGCLEAN ELECTRIC CO., LTD., Suzhou New District, Suzhou, Jiangsu (CN)

( * ) Notice: Subject to any disclaimer, the term of this patent is extended or adjusted under 35 U.S.C. 154(b) by 0 days.

(21) Appl. No.: 15/550,949

(22) PCT Filed: Dec. 24, 2015

(86) PCT No.: PCT/CN2015/098647
§ 371 (c)(1),
(2) Date: Aug. 14, 2017

(87) PCT Pub. No.: WO2016/127708
PCT Pub. Date: Aug. 18, 2016

(65) Prior Publication Data
US 2018/0028031 A1 Feb. 1, 2018

(30) Foreign Application Priority Data
Feb. 15, 2015 (CN) .......................... 2015 1 0081910

(51) Int. Cl.
*A47L 9/00* (2006.01)
*A47L 9/22* (2006.01)
*H02K 5/24* (2006.01)

(52) U.S. Cl.
CPC ............... *A47L 9/22* (2013.01); *A47L 9/0081* (2013.01); *H02K 5/24* (2013.01)

(58) Field of Classification Search
CPC ............ A47L 9/28; A47L 9/0081; H02K 7/10
(Continued)

(56) References Cited

U.S. PATENT DOCUMENTS 1,866,154 A * 7/1932 Ell ............................ A47L 9/22
248/568
2,751,038 A * 6/1956 Acheson ................. A47L 5/365
15/325
(Continued)

FOREIGN PATENT DOCUMENTS

CN 101771306 A 7/2010
CN 101945606 A 1/2011
(Continued)

OTHER PUBLICATIONS

International Search Report corresponding to International Application No. PCT/CN2015/098647; dated Mar. 25, 2016. with English translation.
(Continued)

*Primary Examiner* — Terrell L McKinnon
*Assistant Examiner* — Michael McDuffie
(74) *Attorney, Agent, or Firm* — Cantor Colburn LLP

(57) ABSTRACT

A motor noise reduction structure for a dust collector, and the dust collector are provided. The noise reduction structure includes: a mounting portion, used for mounting a motor on a dust collector; and elastic components, used for applying tension to the motor. One end of each elastic component is connected to the mounting portion, and the other end of the elastic component is connected to the motor. The tension can counteract the gravity of the motor. The number of the elastic components is at least two. The elastic components are uniformly distributed at the circumference of the motor. An included angle of 10 to 85 degrees is formed between the direction of the tension and the horizontal plane. By means of the motor noise reduction structure for a dust collector and the dust collector, a good motor noise reduction effect can be obtained.

4 Claims, 1 Drawing Sheet

(58) Field of Classification Search
USPC .................... 248/556, 610, 611, 638; 55/322
See application file for complete search history.

(56) References Cited

U.S. PATENT DOCUMENTS

| | | | | |
|---|---|---|---|---|
| 2,779,432 A * | 1/1957 | Meyerhoefer | .......... | A47L 5/365 15/323 |
| 3,065,941 A * | 11/1962 | Loftis | ..................... | F16F 15/06 248/604 |
| 3,494,471 A * | 2/1970 | Grippo | ..................... | B04B 9/14 210/363 |
| 4,174,189 A * | 11/1979 | Elson | ..................... | F25B 31/02 248/544 |
| 4,759,526 A * | 7/1988 | Crawford | ................ | F16M 1/00 248/604 |
| 5,090,657 A * | 2/1992 | Dreiman | ............... | F16F 15/067 248/624 |
| 5,269,159 A * | 12/1993 | Oh | ......................... | D06F 37/20 200/61.45 R |
| 5,353,469 A * | 10/1994 | Fellhauer | ............... | A47L 7/0028 15/326 |
| 5,492,456 A * | 2/1996 | Knight | ................... | F04D 29/626 248/604 |
| 5,520,029 A * | 5/1996 | Savkar | .................... | D06F 37/24 248/610 |
| 5,613,380 A * | 3/1997 | Savkar | .................... | D06F 37/20 248/610 |
| 5,647,570 A * | 7/1997 | Berfield | .................... | A47L 9/00 15/326 |
| 5,657,649 A * | 8/1997 | Lim | ......................... | D06F 37/24 248/613 |
| 6,094,774 A * | 8/2000 | Larsen | ..................... | A47L 5/22 15/326 |
| 6,574,997 B1 * | 6/2003 | Mayer | ..................... | D06F 37/20 188/129 |
| 6,810,989 B1 * | 11/2004 | Dantlgraber | ............. | H02K 5/24 123/195 R |
| 8,181,944 B2 * | 5/2012 | Brewster | ................ | F16F 15/067 267/136 |
| 8,689,397 B2 * | 4/2014 | Van De Veen | ........ | A47L 9/0081 15/326 |
| 9,693,662 B2 * | 7/2017 | Tadina | .................. | A47L 9/0081 15/326 |
| 2016/0090679 A1 * | 3/2016 | Davis | ..................... | D06F 37/24 68/3 R |

FOREIGN PATENT DOCUMENTS

| | | |
|---|---|---|
| CN | 102090863 A | 6/2011 |
| CN | 102670127 A | 9/2012 |
| CN | 103117624 A | 5/2013 |
| CN | 203280333 U | 11/2013 |
| CN | 203815390 U | 9/2014 |
| CN | 203815391 U | 9/2014 |
| CN | 203852307 U | 10/2014 |
| CN | 204578278 U | 8/2015 |
| EP | 2907435 A1 | 8/2015 |
| EP | 2907436 A1 | 8/2015 |
| EP | 2907438 A1 | 8/2015 |
| JP | 2001320854 A | 11/2001 |
| WO | 9404822 A1 | 3/1994 |

OTHER PUBLICATIONS

Extended European Search Report corresponding to Application No. 15881856.7-1018/3257418 PCT/CN2015098647; dated Oct. 11, 2018.

SIPO First Office Action corresponding to CN Application No. 201510081910.1; dated Aug. 1, 2016.

* cited by examiner

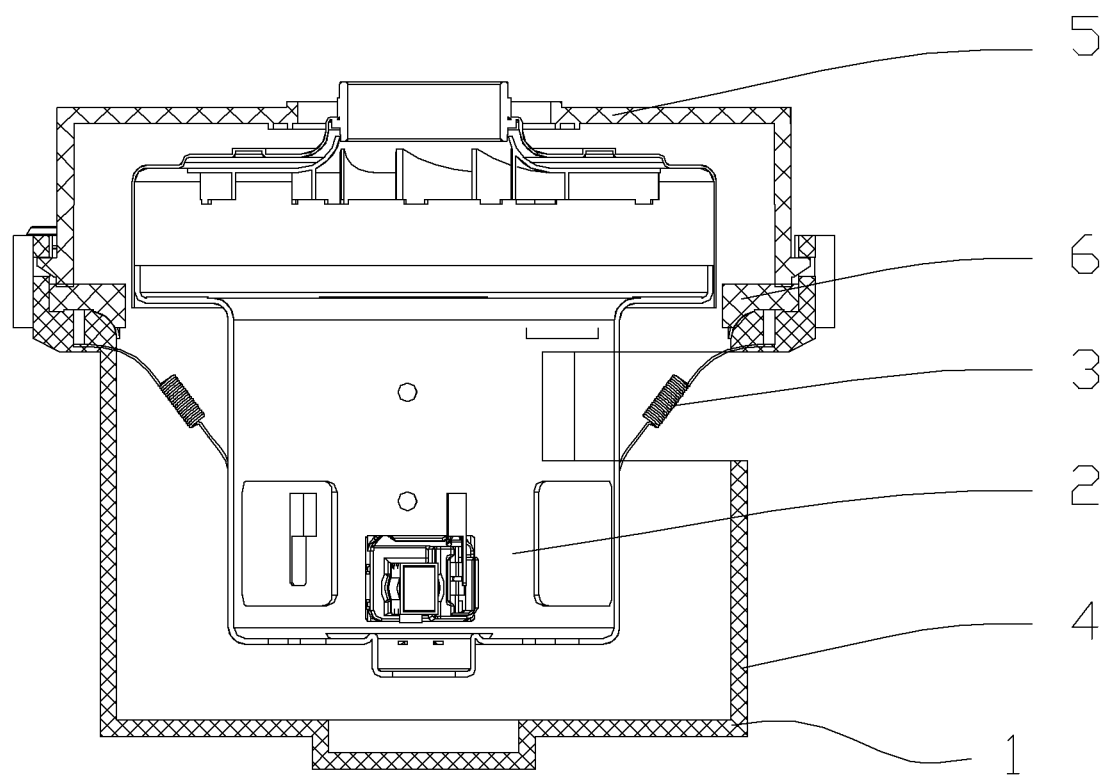

MOTOR NOISE REDUCTION STRUCTURE FOR DUST COLLECTOR, AND DUST COLLECTOR

This is the U.S. national stage of application No. PCT/CN2015/098647, filed Dec. 24, 2015. Priority under 35 U.S.C. § 119(a) and 35 U.S.C. § 365(b) is claimed from Chinese Application No. 201510081910.1, filed Feb. 15, 2015, the disclosures of which are also incorporated herein by reference.

FIELD

The present application relates to the field of cleaning apparatus, and more particularly, to a motor noise reduction structure for a dust collector, and the dust collector.

BACKGROUND

With the development of society and the continuous improvement of people's lives, dust collectors as household cleaning apparatuses have been used in more and more families. A dust collector is an electrical appliance which utilizes a motor to produce an air negative pressure in a sealed housing so as to suck dust or garbage. Currently, main functions of the dust collector are to collect and clean the dust and garbage on the ground, on a carpet, or the like at home.

With the development of technology, the functions of the dust collector are improved, and the power of a motor of the dust collector is gradually increased as well. Since the low-frequency noise of the dust collector mainly comes from the vibration in the rotation of the motor, the noise of the dust collector is also increased as the motor power of the dust collector gradually increases.

Chinese Patent No. 201420068907.7 discloses a motor noise reduction structure. In this patent, a motor is supported in a motor cover mainly through an elastic support sheet, which achieves shock absorption for the motor. Since the elastic support sheet and the motor are connected by means of screws, the contact between the elastic support sheet and the motor and the contact between the elastic support sheet and the screw are apt to loose after a period of use, thus the overall noise reduction effect is reduced. The Chinese Patent No. ZL201420068273.5 discloses a motor noise reduction structure. This patent mainly utilizes an elastic support sheet and an elastic cushion to achieve shock absorption of a motor. Similarly, this patented technology also has the above issue. Chinese Patent No. ZL201420172065.X also discloses a motor noise reduction structure, which utilizes a compression spring to support the gravity of a motor, thereby addressing the issue of loosening of contact between the elastic support sheet and the motor in the above patents. The patented technology employs the compression spring to support the motor and in a normal operation state, the compression spring is compressed under the gravity of the motor, however, since there will be a circumferential rotation force as the motor is rotating, and the main elastic deformation direction of the compression spring is along the direction of gravity, the compression spring may be subjected to a force perpendicular to the direction of gravity in the case that a circumferential rotation force is generated, thereby causing the compression spring to be deformed by the influence of the circumferential force. Furthermore, since the reset capability of the deformation of the compression spring in the non-gravity direction is weak, the motor may swing in the circumferential direction under the influence of the circumferential force, thereby resulting in poor overall noise reduction effect.

SUMMARY

In view of the deficiencies of the conventional technology, a motor noise reduction structure for a dust collector and the dust collector are provided according to the present application, which achieve a better motor noise reduction effect.

In order to achieve the above object, the motor noise reduction structure for the dust collector is provided according to the present application, and the noise reduction structure includes:

a mounting part configured to mount a motor to the dust collector; and an elastic component configured to apply a pulling force to the motor, wherein the elastic component has one end connected to the mounting part and another end connected to the motor, and the pulling force counteracts the gravity of the motor.

Optionally, the number of the component is at least two.

Optionally, the components are uniformly distributed in a circumferential direction of the motor.

Optionally, an included angle between the direction of the pulling force and a horizontal plane ranges from 10 degrees to 85 degrees.

Optionally, the mounting part includes a motor cover or other components in which the motor is mounted.

Optionally, the motor cover includes an inner motor cover and an outer motor cover. The inner motor cover and the outer motor cover form an accommodation space for accommodating the motor. The elastic components are connected to the outer motor cover or the inner motor cover Optionally, the elastic components are connected to the inner motor cover.

Optionally, a lower portion of the motor is suspended in the inner motor cover.

Optionally, the elastic component is a tension spring.

A dust collector is further provided according to the present application, which includes the motor noise reduction structure as described in any one of the above aspects.

As can be seen from the above description, the motor noise reduction structure according to the present application is provided with an elastic component, and the motor is suspended by the elastic component, and the elastic component is in a stretched state regardless of whether the motor is in a rotating or non-rotating state, thus the elastic component does not have an elastic failure state. Moreover, the stretching of the elastic component is always in a main deformation direction of the elastic component, such that the elastic component has a relatively strong reset capability and can effectively suppress the circumferential vibration of the motor, thereby achieving better noise reduction effect by means of the motor noise reduction structure of the dust collector according to the present application.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for the person skilled in the art, other drawings may be obtained based on these drawings without any creative efforts.

FIG. 1 is a schematic view showing the structure of a motor noise reduction structure according to an embodiment of the present application.

DETAILED DESCRIPTION

For persons skilled in the art to better understand the technical solutions in the present application, the technical solutions in the embodiments of the present application will be described clearly and completely in conjunction with the drawings in the embodiments of the present application. Apparently, the described embodiments are only a few embodiments rather than all of the embodiments of the present application. Other embodiments obtained by the person skilled in the art without any creative efforts based on the embodiments of the present application should fall into the scope of the present application.

Reference is made to FIG. 1. A motor noise reduction structure of a dust collector according to an embodiment of the present application is shown in the FIGURE. The noise reduction structure includes a mounting part configured to mount the motor 2 to the dust collector; and an elastic component 3 configured to apply a pulling force to the motor 2, the elastic component 3 has one end connected to the mounting part and another end connected to the motor 2. The pulling force can counteract the gravity of the motor 2.

In use, the motor noise reduction structure according to this embodiment is placed in a housing of the dust collector to assemble and form the dust collector. When the dust collector is in an unused state, the motor 2 is in an inoperative state and is suspended by the elastic component 3, causing the elastic component 3 to be in a stretched state. When the dust collector is in a use state, the motor 2 is in an operative state and generates a certain torque, causing the elastic component 3 to be subjected to a certain degree of stretching on the basis of the original elongation, that is, there is a secondary stretching. Since the secondary stretching is still in a main elastic deformation direction of the elastic component 3, the elastic component 3 has a relatively strong reset capability for the secondary stretching, thereby effectively overcoming the circumferential vibration caused by the operation of the motor.

As can be seen from the above description, the motor noise reduction structure according to the present application is provided with the elastic component 3, and the motor 2 is suspended by the elastic component 3. Thus, the elastic component 3 is in a stretched state regardless of whether the motor 2 is in a rotating or non-rotating state, thus, the elastic component 3 does not have an elastic failure state. Moreover, the stretching of the elastic component 3 is always in the main deformation direction of the elastic component 3, and the elastic component 3 has a relatively strong reset capability and can effectively suppress the circumferential vibration of the motor, thereby achieving better noise reduction effect by means of the motor noise reduction structure of the dust collector according to the present application.

Reference is continuously made to FIG. 1. The mounting part is configured to mount the motor 2 to the dust collector through the elastic component 3 and may provide a connecting position for the elastic component 3. Specifically, the mounting part may include a motor cover 1 as shown in FIG. 1. Of course, the mounting part may also include other components in which the motor 2 can be mounted, such as a rib plate or lug plate, which is located in the housing of the dust collector and connected to the elastic component and may be used as the mounting part, so all the components capable of mounting the motor 2 to the dust collector can be used as the mounting part. In this embodiment, the motor cover 1 may be a preferred solution of the mounting part.

The motor cover 1 may be in a hollow cylindrical shape overall and is configured for placing the motor 2. Specifically, as shown in FIG. 1, the motor cover 1 may include an inner motor cover 4 and an outer motor cover 5 which may be arranged up and down in a vertical direction, and the outer motor cover 5 and the inner motor cover 4 may form an accommodation space for accommodating the motor 2. The outer motor cover 5 may be covered above the inner motor cover 4 with a sealing ring 6 arranged therebetween, thereby sealing the connecting place therebetween. The elastic component 3 may be connected to the outer motor cover 5, or may also be connected to the inner motor cover 4. This application is not limited thereto.

As shown in FIG. 1, in a preferred embodiment, the elastic component 3 may be connected to the inner motor cover 4. The joint between the elastic component 3 and the inner motor cover 4 can be close to the connecting place between the inner motor cover 4 and the outer motor cover 5. Further, a lower portion of the motor 2 may be suspended in the motor cover 1, thus a certain distance between a lower portion of the motor 2 and the bottom of the motor cover 1 is maintained. This distance may allow the motor 2 to vibrate up and down in a certain range. Of course, additional cushioning members (such as a shock absorption pad, a spring member, etc.) may be provided between the tail of the motor 2 and the motor cover 1 to achieve corresponding shock absorption effect.

In this embodiment, the solution in which the lower portion of the motor 2 is suspended in the inner motor cover 4 is a preferred solution, and only the elastic component 3 is required in the preferred solution, so the cost is low. Furthermore, in this preferred solution, the lower portion of the motor 2 is not in contact with the bottom of the inner motor cover 4, and the motor 2 is connected to the motor cover 1 only by the elastic component 3 to achieve resilient shock absorption, in this way, the vibration of the motor 2 is transmitted to the motor cover 1 only by the elastic component 3, thereby obtaining better shock absorption and noise reduction effect.

The elastic component 3 connects the motor 2 to the motor cover 1 and suspends the motor 2 in the motor cover 1 by pulling the motor 2. The elastic component 3 achieves the purpose of shock absorption and noise reduction for the motor 2 during the rotation of the motor 2 by its own resilient recovery capability. In order to achieve better noise reduction effect, the elastic component 3 may be a tension spring. The tension spring has one end connected to the motor cover 1 and another end connected to the motor 2. The tension spring can be connected to the motor cover 1 and the motor 2 in many different ways, such as by welding or detachable connection, and this application is not limited thereto. Moreover, the position where the elastic component 3 is connected to the motor 2 may be a side wall of the motor 2, and the motor 2 may be restricted in the motor cover 1 by the pulling of multiple elastic components 3.

In a specific embodiment, in order to ensure the motor 2 to be located at the center of the motor cover 1 without tilting, the number of elastic components 3 may be at least two. The number of the elastic components 3 can be set flexibly depending on practical production requirements, as long as it can ensure that a resultant force of the elastic forces of the elastic components 3 can counteract the gravity of the motor 2.

Of course, the number of the elastic components 3 is not the more the better, and in practical production, the optimum number is the number that ensures the noise reduction effect of the motor to be best. Further, the elastic components 3 can be distributed around the motor 2 in various manners. For example, four elastic components 3 may be uniformly distributed in a circumferential direction around the motor 2, or multiple groups of elastic components uniformly distributed around the motor 2 with each of the group including two elastic components. In this embodiment, a better implementation is that the elastic components 3 are uniformly distributed around the motor 2 in the circumferential direction, thus better noise reduction effect of the motor 2 is obtained.

Further, reference is continuously made to FIG. 1. An included angle between the direction of the pulling force and a horizontal plane ranges from 10 degrees to 85 degrees, and the included angle can be selected flexibly depending on the practical production condition. In order to form the included angle, each of the elastic components 3 may be arranged in a radial shape in a direction from the end connected to the motor 2 to the end connected to the motor cover 1. Taking the elastic component 3 being connected to the inner motor cover 4 as an example, the elastic component 3 is extended outwardly in a direction from the end connected to the motor 2 to the end connected to the motor cover 1 and is in a radial shape. By being provided with the included angle, especially in the case that the elastic component 3 is a tension spring, the motor noise reduction structure is more convenient to be manufactured. Furthermore, the pulling force applied by the elastic component 3 to the motor 2 is pointed outwardly, which provides a better restoring force for the vibration and the rotation generated by the motor 2 when the motor 2 is in operation, thereby obtaining better shock absorption effect.

A dust collector is further provided according to an embodiment of the present application, which includes the motor noise reduction structure as described above.

In use, when the dust collector is in an unused state, the motor 2 is in an inoperative state and is suspended by the elastic component 3, causing the elastic component 3 to be in a stretched state. When the dust collector is in a used state, the motor 2 is in an operative state and generates a certain torque, causing the elastic component 3 to be subjected to a certain degree of stretching on the basis of the original elongation, that is, there is a secondary stretching. Since the secondary stretching is still in the main elastic deformation direction of the elastic component 3, the elastic component 3 has a relatively strong reset capability for the secondary stretching, thereby effectively overcoming the circumferential vibration caused by the operation of the motor.

As can be seen from the above description, the dust collector according to the present application is provided with the motor noise reduction structure, and the motor 2 is connected by the elastic component 3 of the motor noise reduction structure and is suspended by the elastic component 3, thus the elastic component 3 is in a stretched state regardless of whether the motor 2 is in a rotating or non-rotating state, and therefore, the elastic component 3 does not have an elastic failure state. Moreover, the stretching of the elastic component 3 is always in the main deformation direction of the elastic component 3, thus the elastic component 3 has a relatively strong reset capability and can effectively suppress the circumferential vibration of the motor, thereby achieving better noise reduction effect by means of the dust collector according to the present application.

The basic principles, main features and advantages of the present application have been shown and described hereinabove. It should be understood by the person skilled in the art that the present application is not limited by the above-described embodiments and that the descriptions in the above embodiments and the description are only for the purpose of illustrating the principles of the present application. Various variations and improvements may be made to the present application without departing from the spirit and scope of the present application, and all those variations and improvements fall within the scope of the present application. The scope of the present application is defined by the appended claims and their equivalents.

What is claimed is:

1. A motor noise reduction structure for a dust collector, comprising:
    a mounting part configured to vertically mount a motor to the dust collector, the mounting part comprises a motor cover, the motor cover comprises an inner motor cover and an outer motor cover, and the inner motor cover and the outer motor cover form an accommodation space for accommodating the motor, and a lower portion of the motor is suspended in the inner motor cover to allow a certain distance to be maintained between a lower portion of the motor and the bottom of the inner motor cover; and
    at least two tension springs configured to apply a pulling force to the outer motor cover,
    wherein each of the tension springs has one end connected to the mounting part and another end connected to a side wall of the motor, and the pulling force counteracts the gravity of the motor, each of the tension springs is further stretched when the motor is in an operative state, which effectively overcomes the circumferential vibration caused by the motor,
    wherein an included angle between the direction of the pulling force and a horizontal plane ranges from 10 degrees to 85 degrees.

2. The motor noise reduction structure according to claim 1, wherein the tension springs are uniformly distributed in a circumferential direction of the motor.

3. A dust collector, comprising the motor noise reduction structure according to claim 1.

4. A dust collector, comprising the motor noise reduction structure according to claim 2.

* * * * *